W. WALKER.
TILE AND SEWER TRAP.
APPLICATION FILED MAY 18, 1921.
1,397,471. Patented Nov. 15, 1921.
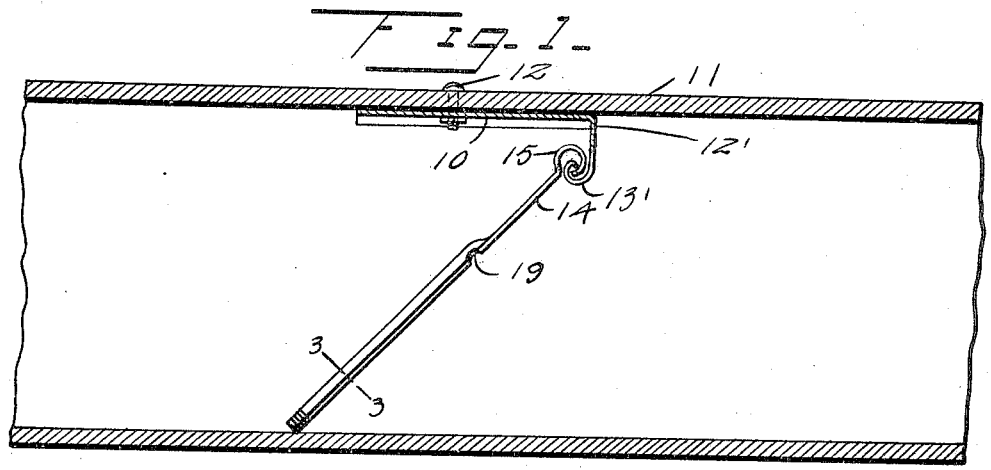
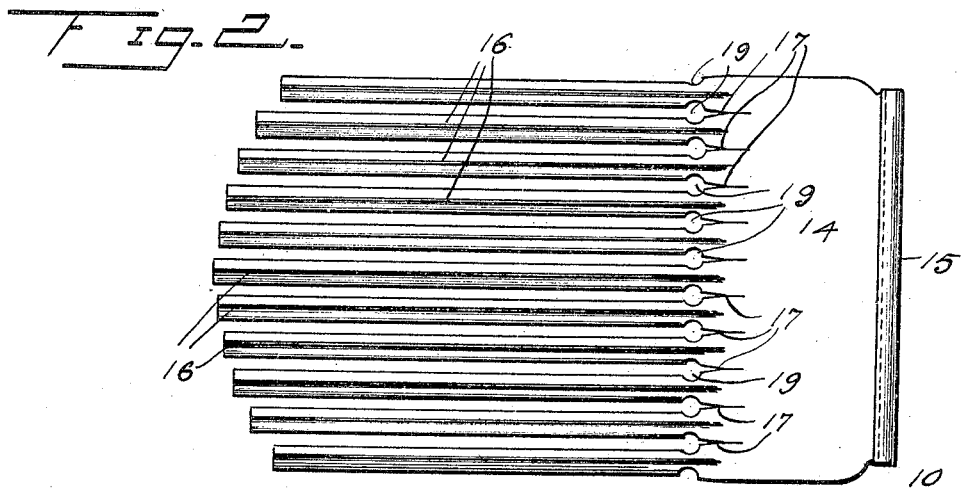
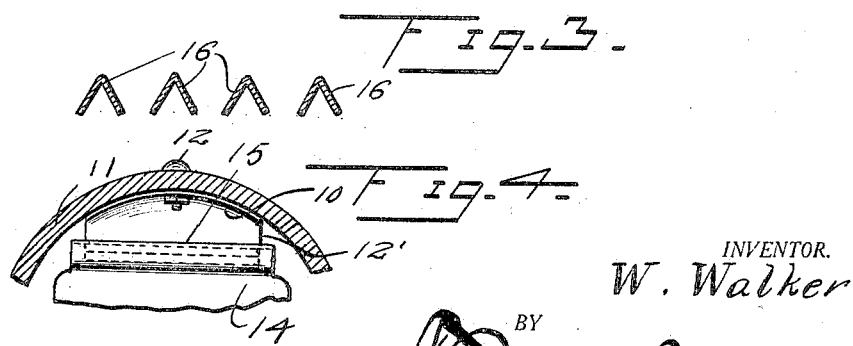
INVENTOR.
W. Walker
BY
ATTORNEY.

UNITED STATES PATENT OFFICE.

WILLIAM WALKER, OF FAIRBURY, ILLINOIS.

TILE AND SEWER TRAP.

1,397,471.  Specification of Letters Patent.  Patented Nov. 15, 1921.

Application filed May 18, 1921. Serial No. 470,733.

*To all whom it may concern:*

Be it known that I, WILLIAM WALKER, a citizen of the United States, residing at Fairbury, in the county of Livingston and State of Illinois, have invented certain new and useful Improvements in Tile and Sewer Traps; and I do hereby declare the following to be a full, clear, and exact description of the invention, such as will enable others skilled in the art to which it appertains to make and use the same.

This invention relates to a tile or sewer trap, and the object is to prevent animals from passing through drain pipes and thus obstructing the same.

A further object is to provide means whereby the flow of water will be practically unobstructed, and yet it will not be possible for animals to pass through the tiling or drain pipe, and in the event that the pipe is so located that there may be at times a back flow, any article tending to obstruct the pipe will be prevented from entering it, or at least from passing beyond the point where the trap is located.

A still further object is to provide a device which may be used when desired for trapping small animals.

A still further object is to provide a pivotally mounted gate comprising a plate and a supporting member, the supporting member being secured to the terra cotta pipe, and the plate being preferably formed with a plurality of prongs, channel-shape in cross section and slightly spaced apart, for permitting the liquid to readily pass through. The gate so formed swings at an angle, as shown in the drawings and effectively prevents the passage of any object in a direction opposite to that in which the water is flowing. It will be understood that when the device is used for an animal trap *per se*, it will be reversed in position, so that the animals may pass in, but cannot pass out.

In the accompanying drawings:

Figure 1 is a view of the device in elevation as mounted within a section of tile, Fig. 2 is a plan view, Fig. 3 is a transverse section through the channel members forming the prongs, Fig. 4 is a sectional view illustrating the manner in which the pivot pin of the trap is mounted in a tile.

In carrying out the invention, a blank sheet of metal is slotted and pressed into form for producing the swinging gate, the only other element being required being a supporting plate or member. The plate or member is designated 10 and is secured to the pipe or terra cotta tile 11 by fasteners 12 and has an angularly related portion 12' that is rolled to form a hinge portion 13'.

The gate includes a portion 14 having a plain surface, the extreme end of which is rolled to form a tubular element 15 adapted to hook or engage in the hinge portion 13'.

The prongs 16 are formed by cutting longitudinal slits 17 in the original sheet, and then pressing these strips of metal thus formed into approximately V-shape. The inner ends of the prongs may be cut away as shown at 19, and the outer ends are made to conform approximately with the curved inner surface of the tile 11, in order that there may be intimate contact therewith.

From the foregoing, the construction and operation of the device will be apparent, but particular attention is directed to the fact that the entire swinging member is formed of one piece of metal and that it is readily installed by one without previous experience in such work. When used as a trap for capturing animals, the device is always set, and is as efficient in this connection as in the connection first indicated.

Having thus described the invention, what I claim is:—

1. A conduit trap plate made from a single blank having longitudinal slits providing elongated prongs, said prongs being deflected transversely to rigidify them and to provide slots for passage of water between them, a plate portion from which said prongs extend, and a substantially arcuate hinge member at the free edge of said portions disposed transversely of the plate.

2. A trap means for round conduits consisting of an attaching member transversely arcuate to conform to the inner curvature of the conduit, said member having a depending portion integral therewith, the lower edge of said portion being substantially arcuate to provide a hinge member, and a trap plate having a substantially arcuate hinge member coöperating with said hinge member.

3. A trap means for round conduits consisting of a plate made from a single blank having longitudinal slits providing elongated prongs, said prongs being deflected transversely to rigidify them and to provide water penetrating slots between them, a plate portion from which said prongs extends, a substantially arcuate hinge member at the free edge of said portion disposed transversely of the plate, a suspending means for the plate comprising an attaching member transversely arcuate to conform to the inner curvature of the conduits, said attaching member having a depending portion integral therewith, and the lower edge of said portion being substantially arcuate to provide a hinge member to coöperate with the first mentioned hinge member.

In testimony whereof I affix my signature in presence of two witnesses.

WILLIAM WALKER.

Witnesses:
 ERMA FITZGERALD,
 CHAS. W. VESTAL.